UNITED STATES PATENT OFFICE.

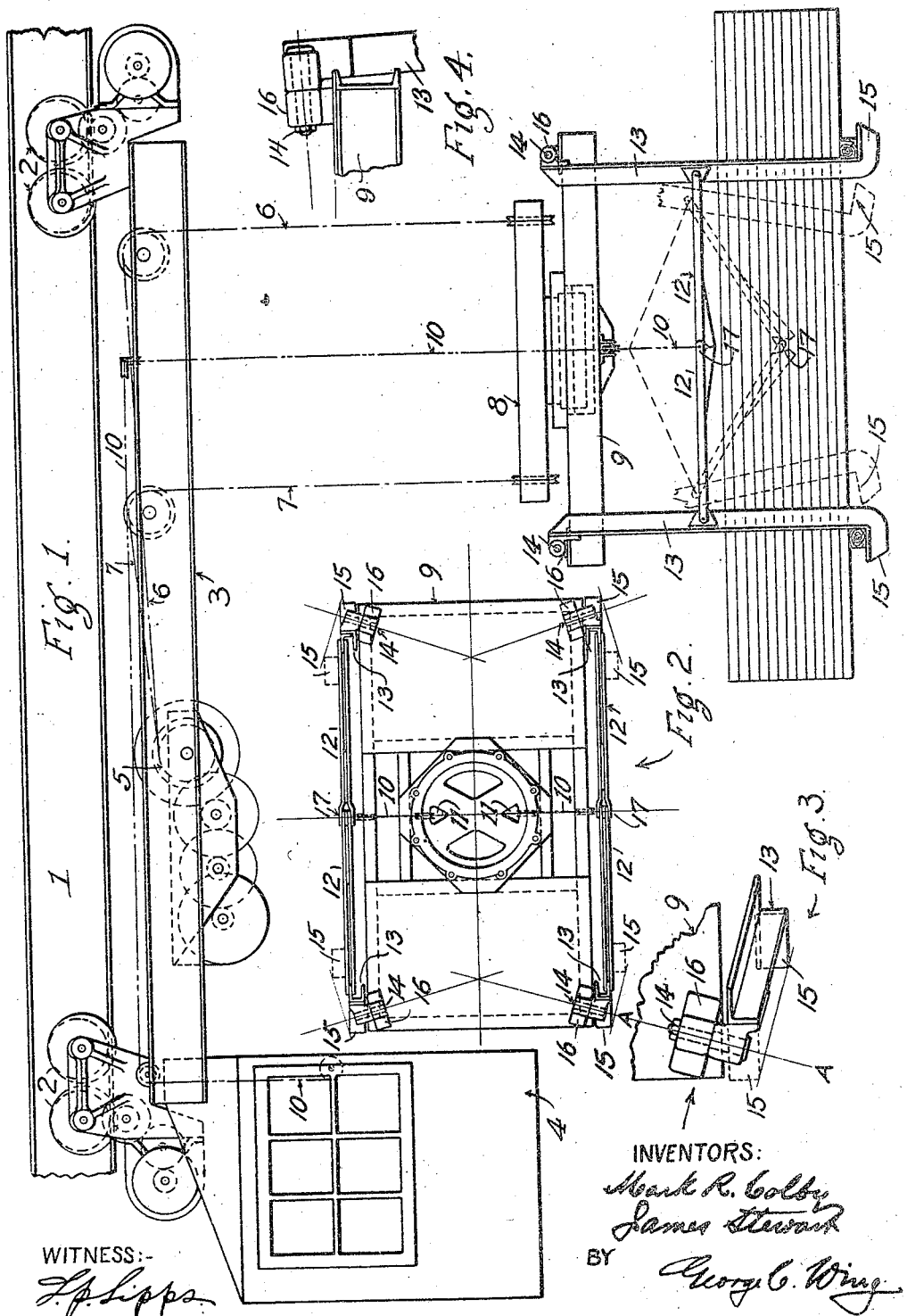

MARK R. COLBY, OF PORTLAND, OREGON, AND JAMES STEWART, OF CLEVELAND, OHIO, ASSIGNORS TO THE BROWN HOISTING MACHINERY COMPANY, OF CLEVELAND, OHIO, A CORPORATION.

GRAPPLE FOR HOISTING AND CONVEYING MACHINES.

1,201,258.      Specification of Letters Patent.      Patented Oct. 17, 1916.

Application filed June 21, 1915. Serial No. 35,434.

*To all whom it may concern:*

Be it known that we, MARK R. COLBY, a citizen of the United States, residing at the city of Portland, in the county of Multnomah and State of Oregon, and JAMES STEWART, a subject of Great Britain, residing in the city of Cleveland, in the county of Cuyahoga and State of Ohio, have invented a new and useful Improvement in Grapples for Hoisting and Conveying Machines, of which we hereby declare the following to be a full, clear, and exact description, reference being made therein to drawings accompanying and made a part of the specification, wherein the same mechanical parts are designated by the same numerals in each instance.

The invention belongs generally to the class of hoisting and conveying apparatus designed to be suspended from or connected to a trolley, which is movably mounted on an overhead trackway, in order to thereby grapple gross loads, like lumber, leather or cotton, which are prepared, for the most part, in piles, packages or bales, of convenient size and dimensions for the process, and carry the same to given points for deposit.

This apparatus has a wide field of usefulness in connection with the handling of lumber on a large scale at mills, mill-yards, transfer and storage places, and the illustration of the improvement in question for the purpose of this application, is accordingly of that improvement as applied to operations in that special department of the art to which it relates. As thus applied, the machine, as a whole, is characterized by an overhead trackway, generally in the form of an I-beam, extending, between terminals, above the area or space to be served, a main trolley duly mounted thereon, and lumber-grappling and hoisting mechanism operatively connected thereto. As commonly made this last named feature comprises a hoisting-head of rectangular form, horizontally suspended from its ends by ropes, to corresponding winding ends on the trolley-frame, and a rectangular frame rotatably hung from this head and provided, at each corner, with downwardly extending hook-arms by which the grapple is made. Said hook-arms are sometimes rigidly connected to the frame at their upper ends with grap-
pling-hooks pivoted to their lower ends, or,
being integrally hooked at said ends, are pivoted to the frames at their upper ends. In either form, said arms, and their hook movements, are always in the same vertical plane with the sides of the frame from which they depend, and in consequence, although the hook-arms, or the hooks, themselves, may be retracted so as to avoid the usual skids or cross-pieces upon which the packages rest, they nevertheless will remain normal and with but slight clearance with respect to the same at all stages of the grappling operations. There is, accordingly, a resultant liability that the arms will contact with the top of the load, when said frame is lowered to make a grapple, so that repeated up and down movements of the same, and consequent loss of time, are required, before the hook-arms are in position to freely pass down the sides of the load, as designed.

The purpose of the present invention is to obviate the difficulties of spotting a grapple of the kind in question, by the simple change in detail which we will now point out.

In the drawings Figure 1 is an indicative illustration, in side elevation, of a machine containing said improvement, the dotted lines showing the relative places of the parts involved both when the retraction of the arms is effected by the down-fall of the actuating bars for the same, and by an upward pull thereof. Fig. 2 is a plan of a rectangular grapple-frame provided with our hook-arms at each corner, Fig. 3 is an enlarged view of the hinge-connection of said arms to said frame, and, Fig. 4 is a view of said hinged-connection, at right angles to the line A, A, in Fig. 3, in the direction of the arrow.

Referring to the drawings 1 indicates an overhead tramway of the I-beam type. Movably mounted thereon by its wheels 2 is a trolley 3, from which hangs the operator's cab 4. Winding drums 5 are located transversely of the trolleys with cables 6 and 7 arranged in pairs thereon. These, respectively, extend to and around correspondingly arranged sheaves on the trolley, downwardly to and around sheaves at the ends of a hoisting head 8 and thence, upwardly it is assumed, to anchorages on the trolley above.

Below the hoisting-head 8, and, usually, in rotatable relation therewith, is the grapple proper. In this case, as will be apparent, it is made up of a rectangular grapple-frame 9 suspended from the head 8 by an open center connection indicated by the dotted lines, through which a grapple-rope 10, may pass downwardly through apertures 11, 11, in the frame to hook-arm lever-bars or links 12, and, upwardly, over suitably located sheaves, to a point in the cab 4 for the application of hand, or other power.

At each corner of the frame are exteriorly depending hook-arms 13, pivotally connected to the sides thereof by the hinge-pins or pivots 14. These arms are straight angle pieces which terminate, at their lower ends in oppositely disposed integral hooks 15. These hook-arms are arranged, at said corners, at the longer side of the frame, and in such a pivotal relation that they will be vertical when in their designed grappling places, but, when retracted from, and out of such relation, they will open around their hinges away from the vertical, and assume a diagonal position with respect to a transverse vertical plane through the frame itself. This peculiarity of movement by said hooks or grappling arms, is effected by giving the requisite angular direction to the hinge-pins or pivots 14, that is to say, locating them in their bearings at any desired or predetermined angle relative to said vertical plane. The hinge-boxes or pieces 16, within which said pivots are to rest, are accordingly set with their naves or hubs pointed in conformity with such angle, with the result, of course, that, when the hook-arms are duly affixed or hinged to the boxes they will be adapted to swing outwardly from the sides of the frame, when free to move around their hinged connections, and, thereafter, to be brought up or returned to their normal perpendicular position with the upper face of the hooks proper in full bearing beneath the skids under the load to be raised. It is obvious that the desired outward movement of the hook-arms around their hinged connections is entirely consistent with a construction where the hinges themselves are pitched at an angle with a horizontal plane on the frame, instead of lying in such a plane, as shown in the drawings. The hooks proper, at the lower ends of the arms, are preferably turned at normal relations to said arms as a whole. A wider clearance from the load in the process of lowering the grapple astride the same, is insured by the foregoing movement, and, at the same time, by the slanting attitude of the hook-arms the latter will serve to guide the grapple, as a whole, to said operative relation to the load to be hoisted. As a means of actuating the hook-arms, in and out of position around their pivots, the drawings show and signify, the connection together of each pair of hook-arms on a side of the frame, by the lever-bars or links 12, which are pivoted, respectively, to the arms at intermediate points on the same, and are jointedly connected together at their other, or inner ends, at 17. These bars should be of the same length, which should also be such that they will be in one and the same straight line when the arms to which they are connected occupy their normal depending position with respect to said frame. The lever-bars, furthermore, should be of such weight and relative dimensions that, when free to descend by force of gravity around said pivotal connections, their leverage will overcome the inertia of the hook-arms to which they are attracted, and thereby withdraw said arms, from their normal, backwardly around their hinges, to the degree necessary to clear the skids, or cross-pieces, beneath the load, during the lowering stage of the grappling movement. The reverse movement is controlled from the cab 4, by pulling in the lever-bar rope 10, attached to said bars, at 17, for the purpose. This arrangement may, of course, be varied in any suitable manner, as, for instance, the arms or links 12, may be actuated upwardly—as indicated by the upper diagonal dotted lines in Fig. 1—by tension on the rope 10, instead of downwardly, by their own weight, as described, which will directly reverse the said described action, since the opening, or retraction of the hook-arms will then be effected positively, while the closing will occur, automatically, by simply releasing said tension.

Having thus described our invention that which we claim and wish to protect by Letters-Patent is:—

A grapple comprising the combination of a supporting frame, and hook-arms at the sides of the same, said hook-arms being pivotally connected to the frame at their upper ends at predetermined angles with respect to a horizontal and a transverse vertical plane through said frame, substantially as shown and described.

MARK R. COLBY.
JAMES STEWART.

Witnesses for Colby:
 E. B. MILLER,
 DEAN VON ACHEN.
Witnesses for Stewart:
 L. P. LIPPS,
 J. F. LOUCKS.